Jan. 12, 1960 S. GOLDFARB 2,920,931

SHEET RECORD MACHINES

Filed Feb. 3, 1956

INVENTOR
Samuel Goldfarb
BY
George H. Fritzinger
Agt.

United States Patent Office 2,920,931

Patented Jan. 12, 1960

2,920,931

SHEET RECORD MACHINES

Samuel Goldfarb, Morristown, N.J., assignor, by mesne assignments, to McGraw-Edison Company, Elgin, Ill., a corporation of Delaware Application February 3, 1956, Serial No. 563,226

4 Claims. (Cl. 346—138)

This invention relates to sheet record machines which have a revolvable record support for carrying flexible sheet records in wrap-around relation therewith, and more particularly it relates to such machines which have a guide structure for directing sheet records into a loading position for attachment to the record support.

In sheet record machines which are wholly enclosed and which are adapted for recording and transcribing dictation, the user may at times inadvertently mount a second record on the record support while the support is already carrying a first record thereon. This inadvertent double mounting of records is made possible in sheet record machines because the records are attached to the support only at their leading edges and allowed to trail about the support as the support is moved in a forward direction, while leaving access to the support for a second record.

An object of this invention is to provide simple apparatus for such sheet record machines which is adapted to preclude possible double mounting of sheet records on the record support.

More particularly, it is an object to provide means controlled by a sheet record as the record is wrapped onto the record support for blocking the guide path to prevent the mounting of a second record so long as the first record is wrapped onto the support.

These and other objects and features of my invention will be apparent from the following description and the appended claims.

In the description of my invention reference is had to the accompanying drawings, of which:

Figure 1:
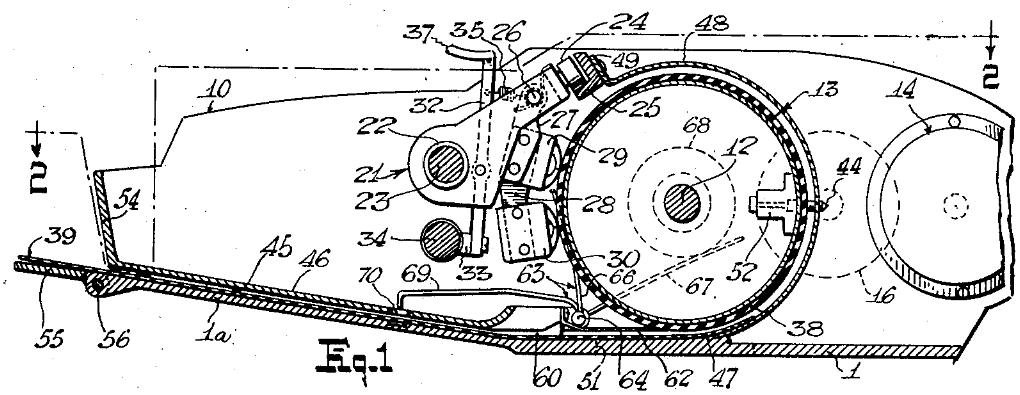
Figure 1 is a fractional, vertical section of a sheet record machine incorporating my invention, taken substantially on the line 1—1 of Figure 2.

The sheet record machine shown in the accompanying drawings is a dictation-recording and -reproducing machine adapted for operation on and from magnetic type sheet records. The machine has a base 1 provided with side standards 10 and 11. These standards have bearings for a shaft 12 carrying a rotatable record support in the form, for example, of a drum 13. The drum is driven by a motor 14 coupled, for example, by a belt 15 to an intermediate wheel 16. This wheel is journaled in a bearing 17 on the standard 10 and has a stub shaft 18 coupled as by a belt 19 to a wheel 20 secured to the shaft 12. This constitutes a permanent drive connection between the motor and drum which is made permissible by using any suitable quick-start motor of a reversible type.

At the front of the drum there is a carriage 21 of an inverted-U shape, the legs of which are apertured to receive a sleeve 22. This sleeve is slidably mounted on a cross rod 23 carried at its ends by the standards 10 and 11. The carriage is supported in a rearwardly-inclined position, as it appears in Figure 1, by means of a roller 24 on the top cross portion thereof riding on a rail 25 carried at its ends by the standards 10 and 11. The support rod 23 and rail 25 are parallel to the axis of the drum to provide for parallel movement of the carriage along the drum.

On the upper portion of the carriage there is a cross pin 26 to which are pivoted two depending arms 27 and 28. The arm 27 carries an erase head 29 at its lower end, and the arm 28 carries a record-reproduce head 30 at its lower end below the erase head. By mounting the heads on the confronting sides of the two arms they are vertically spaced from each other for engaging the same track on the record. By suitable biasing, as by torsion springs **27*a* and 28*a* on the cross pin 26**, the heads are pressed yieldably against the drum.

On the carriage near the sleeve 22 is another cross pin 31 on which is pivoted an upright lever 32 carrying a feed nut 33 at its lower end. The feed nut engages the feed screw 34 under influence of a tension spring 35 connected between an upper part of the lever and the pin 26. The feed screw is supported by bearings in the standards 10 and 11 in parallel relation to the support rod 23, and is driven in fixed relation with the drum by any suitable permanent drive coupling therewith not necessary to show. A fingerpiece 37 at the upper end of the lever 32 enables easy manual shifting of the lever to disengage the feed nut and permit manual shifting of the carriage.

Figure 4:
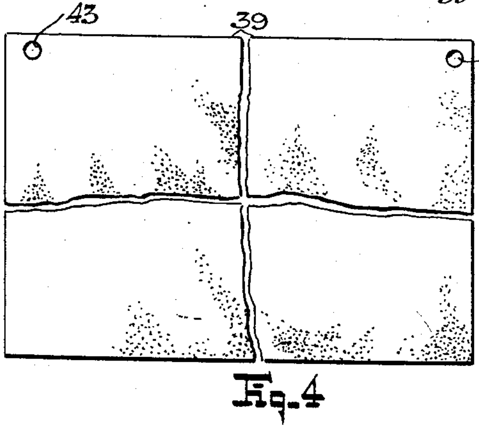
Figure 4 is a fractional view of a sheet record adapted for use with the present machine.

The drum is covered with a resilient layer 38, as of rubber, to provide a yieldable backing for a sheet record 39 (Figure 4) to be mounted in wrap-around relation to the drum. At the ends of the drum there are rim flanges 40 or other suitable means for locating the sheet record lengthwise of the drum. However, the resilient layer 38 is cut short of reaching the rim flanges so as to provide the drum with peripheral grooves 41 and 42 at its ends to underlie the inactive side portions of the sheet record. The sheet record has drive holes 43 for engaging corresponding drive pins 44 projecting radially from the grooved end portions of the drum. Once the leading portion of a sheet record is attached to the drum the record is carried around the drum in wrap-around relation thereto. The leading and trailing edges may be either overlapped or in a substantially butt-joint relationship.

When the drum is driven in a forward direction the heads scan a helical track with the erase head ahead of the record head to erase progressively any prior recording on the track being scanned. When the machine is used as a reproducing instrument, the erase head is disabled. The audio circuits of the machine for feeding signal energy to and from the heads as well as for abling and disabling the erase head need not however be herein described.

The mounting of a sheet record onto the drum 13 involves first presenting the record into a loading position wherein its leading portion is closely adjacent to the drum with the drive holes of the record in the paths of the drive pins, and in then advancing the drum to cause the drive pins to engage the drive holes and carry the sheet record around the drum. The means for presenting the sheet record into loading position comprises a loading apparatus having a slot 45 which may desirably be approximately as long as the sheet record. The slot may be formed between a forward extension **1*a* of the base and an overlying plate 46 of which the latter has turned-down side edges 46*a* to close the slot at the sides, the slot being preferably only slightly wider than the sheet record 39. Directly below the drum the base 1 has a curved surface 47 arcuate about the axis of the drum and spaced from the periphery thereof. At the rearward end of this curved surface the base is recessed to receive the lower end of an arcuate guide plate 48 which forms an even extension of the surface 47 about the drum is spaced relation thereto. This guide plate is terminated at the upper forward part of the drum whereat it has an outwardly-bent lug 49 secured to the back side of the aforementioned rail 25**. This leaves the forward portion of the drum exposed for contact of the heads therewith.

Figure 2:
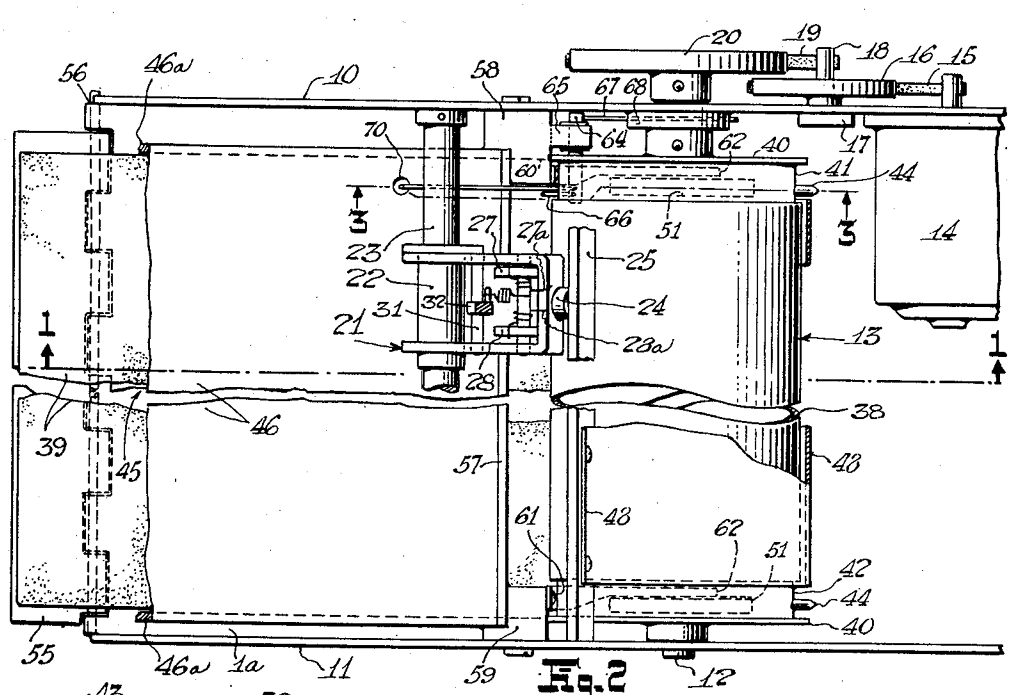
Figure 2 is a fractional, plan view of such machine.
Figure 3:
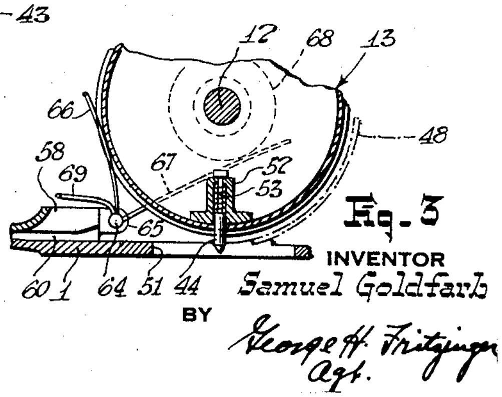
Figure 3 is a fractional section of the record supporting drum and associated parts taken on the line 3—3 of Figure 2.

As shown in Figures 1 and 2, the drive pins 44 are positioned beyond the side edges of the guide plate 48 and have sufficient length to extend radially from the drum beyond the guide plate. In order that the base 1 will clear the drive pins, it is provided with rectangular slots 51 below the drum. Since a sheet record in loading position will overlie these slots except at the rear ends thereof where the drive holes are located, the drive pins are mounted as plungers in respective tubular housings 52 in the drum, and are urged into outer positions by compression springs 53 in the housings back of the pins, as shown in Figure 3. Thus, upon advancing the drum when a sheet record is in loading position as shown in Figure 1, the drive pins will come to bear slidably against the portions of the sheet record overlying the slots 51 and will be cammed inwardly until the pins come into registration with the drive holes, whereupon the pins will snap outwardly through the drive holes to connect the sheet record detachably to the drum.

The forward end of the loading slot is flared to facilitate the insertion of a sheet record thereinto. This is accomplished by providing the slot with an upwardly-inclined wall 54 forming a continuation of the upper plate 46 and which may also constitute a forward wall of a cabinet for the machine, and by providing a closure member or door 55 which is hinged at 56 to the lower plate 1*a* to provide a forward extension of this wall when the door is open. The slot 45 is made approximately as long as the sheet record so that a correct loading position for the sheet record is one wherein the record is fully inserted into the slot, this being a feature claimed in the Dinsmore et al. application Serial No. 468,442 filed November 12, 1954, now Patent No. 2,889,191 granted June 2, 1959, and having common ownership with the present application. However, the loading position need not be precisely determined since any position of the sheet wherein the trailing edge is between the outer end of the open door 55 and the apex of the flared opening is suitable. After a sheet record is so mounted into the slot, the door 55 is swung upwardly into closed position to conceal the trailing edge and to provide a slight frictional grip on the sheet record between the door and the wall 55 so as to hold the sheet record in place until it is picked up by the drive pins on the drum.

The upper plate 46 of the loading structure terminates in an upwardly-curved lip 57 at a slight distance from the drum. However, at the opposite sides of the plate 46 there are rearwardly-extending blocks 58 and 59 which may be cast integrally with the plate. These blocks have undercuts 60 which form with the lower plate 1*a* continuous extensions of the loading slot at the sides of the machine. Mounted on the back faces of these blocks, as by screws 61, are light cantilever springs forming sheet-stripping fingers 62 which extend rearwardly into engagement with the bottom walls of the respective peripheral slots 41 and 42 at the ends of the drum. The purpose of these stripping fingers is to guide the trailing edge of a mounted sheet record positively into the slot 45 when the drum is reversed. For instance, these springs will ride on the side portions of a mounted sheet record until the trailing edge is moved to the fingers, whereupon the fingers will engage the under side of the trailing edge, since it will naturally spring outwardly a small distance away from the drum, to peel the sheet record positively off of the drum and guide it into the slot 45. When the drum has been reversed one full revolution from the point where the stripping action began, the trailing edge of the sheet record will make its appearance at the flared opening.

Reverse movement of the drum to eject a sheet record from the machine may be provided by the drive motor 14 and be under control of the door 55 to occur as the door is pressed downwardly into an eject position below its open position, as in accordance with the teaching of the co-pending Fritzinger application Serial No. 544,154, filed November 1, 1955 and having common ownership with the present application (now Patent No. 2,906,585, dated September 29, 1959).

A feature of sheet record machines unlike machines operable on other record media is that the record is detachably connected to the record support without need for any movable fastening or clamping means which when operated would obstruct the presentation of a second record to the support for attachment thereto. If the sheet record machine is enclosed to conceal the operating mechanism, the user may be apprised as to when a record is on the support, so that he will not inadvertently attempt to record without the machine operating on a record, as by the control apparatus described in the co-pending Yontar application Serial No. 558,031, filed January 9, 1956, and having common ownership with the present invention. However, the dictator may inadvertently insert a second sheet record into the loading slot and start the drive mechanism to cause it to pick up the sheet record and wrap it over the already mounted record on the drum, and having once started such inadvertent double mounting he will have no way of knowing that a second record is being wrapped onto the support. This may lead to difficulties in the operation of the machine and may cause fouling of the records when the drum is reversed to eject a record therefrom.

To safeguard against the foregoing possible misoperation, I provide a means to block the loading slot in response to the mounting of a sheet record onto the drum. This safeguarding means is controlling by a sheet record itself as the record is wrapped onto the drum. For instance, it may comprise a bell crank lever 63 having a shaft 64 pivoted to the back side of the left block 58 as into a rearwardly-extending piece 65 on this block. This lever has an actuating or feeler arm 66 engaging the peripheral groove 41 of the drum at its intermediate portion, the arm being curved away from the drum so that the outer end thereof extends beyond the record-supporting surface as shown in Figure 1. The bell crank lever is spring-loaded normally to urge the actuating arm against the bottom wall of the peripheral groove, as by means of a light cantilever spring 67 secured to the shaft 64 and bearing against a stationary flange 68 on the left standard 10. The bell crank lever has also an obstructing arm 69 for movement into the loading slot. This arm is normally held in a raised position out of the slot by the spring loading of the bell crank lever just described. However, when a sheet record which has been inserted through the loading slot into a loading position is in the process of being wrapped onto the drum, the leading edge thereof will engage the actuating arm 66 and cam the bell crank lever counterclockwise by movement of the arm 66 out of the slot 41 onto the outer surface of the record. As the bell crank lever is so moved the obstructing arm 69 passes through an opening 70 in the loading structure to block the slot 45. The distance from the tip of the obstructing arm through the end of the loading slot and around the drum to the point of engagement of the sheet record with the actuating arm 66 is made greater than the length of the sheet record. This assures that the obstructing arm will not be moved into its obstructing position until after the trailing edge of the sheet record, which is being wrapped onto the drum, has passed the obstructing arm; conversely, this assures that the obstructing arm will be raised clear of the loading slot before the end of the mounted sheet record reaches the same during unloading.

The embodiment of my invention herein particularly shown and described is intended to be illustrative and not limitative of my invention since the same is subject to changes and modifications without departure from the scope of my invention, which I endeavor to express according to the following claims.

I claim:

1. In a sheet record machine having a revolvable record support for carrying a flexible sheet record in wrap-around relation thereto: the combination of fastening means on said support for engaging the leading portion of the sheet record to provide for drive of the record with said support as the support is moved in a forward direction; sheet loading means having a guide slot for receiving and directing a sheet record into a loading position wherein the leading portion of the record is in position for attachment to said support by said fastening means; and means controlled by a sheet record as the same is wrapped onto said support for obstructing said guide slot at at least one point to prevent insertion of another sheet record through the slot into said loading position.

2. The combination set forth in claim 1 wherein said obstructing means includes feeler means positioned for actuation by a sheet record during the final portion of a complete wrap of the record around said support and wherein said obstructing means includes an obstructing element positioned to enter an end portion of said guide slot directly behind the trailing edge of the sheet record being wrapped onto the support.

3. In a sheet record machine having a revolvable record support for carrying a flexible sheet record in wrap-around relation thereto: the combination of projecting pins on said support for engaging complementary drive holes in a sheet record to attach the leading portion of the record to the support; means having a guide path for directing a sheet record into a loading position wherein the drive holes are in the paths of said drive pins to provide for attachment of the sheet record to the support as the support is moved in a forward direction; and operable means having a first element movable into the path of the leading edge of a sheet record and having a second element coupled to said first element and positioned adjacent to said support for movement by the record as the record is wrapped onto said support for causing said first element to block said guide path to prevent insertion of a sheet record into said loading position while another record is mounted on said support.

4. In a sheet record machine having a rotatable drum for carrying a flexible sheet record in wrap-around relation thereto: the combination of projecting pins on said drum for engaging drive holes in leading corner portions of a sheet record to provide for drive of the record with the drum; guide means having a guide slot leading to said drum for receiving a sheet record leading edge first and directing the leading portion thereof into a loading position wherein the drive holes are in the paths of said drive pins to provide for attachment of the record to the drum as the drum is moved in a forward direction, said drum having a peripheral slot in position to underlie a sheet record mounted thereon; and movable safety means having a feeler element biased into said peripheral slot and cammed outwardly therefrom by the leading edge of a sheet record as it is wrapped onto the drum, said safety means having also a blocking element coupled to said feeler element and moved thereby into said guide slot as said feeler element is moved out of said peripheral slot.

References Cited in the file of this patent

UNITED STATES PATENTS

| | | |
|---|---|---|
| 998,663 | Wood | July 25, 1911 |
| 1,702,714 | Weiss | Feb. 19, 1929 |
| 2,672,346 | Roberts | Mar. 16, 1954 |
| 2,695,785 | Dashiell et al. | Nov. 30, 1954 |